United States Patent
Ashton et al.

[15] 3,665,004
[45] May 23, 1972

[54] MANUFACTURE OF HEXAHYDROTRIAZINE STABILIZERS

[72] Inventors: Stanley Ashton; Eric Samuel Nicholson, both of Manchester, England

[73] Assignee: Imperial Chemical Industries Limited, London, England

[22] Filed: Apr. 17, 1970

[21] Appl. No.: 29,696

[30] Foreign Application Priority Data

Apr. 24, 1969 Great Britain......................21,057/69

[52] U.S. Cl....................................260/248 NS, 260/45.8 N
[51] Int. Cl. ........................................................C07d 55/14
[58] Field of Search ............................................260/248 NS

[56] References Cited

UNITED STATES PATENTS 3,538,092 11/1970 Dexter...................................260/248
3,449,340 6/1969 Orth et al..............................260/248

*Primary Examiner*—John M. Ford
*Attorney*—Cushman, Darby & Cushman

[57] ABSTRACT

1,3,5-tris(alkylhydroxyphenylpropionyl)hexahydrotriazines stabilizers for polyolefines, are prepared by reacting alkyl phenols having a free *p*-position with 1,3,5-trisacryloylhexahydrotriazine in presence of an alkali metal catalyst in a polar solvent.

4 Claims, No Drawings

MANUFACTURE OF HEXAHYDROTRIAZINE STABILIZERS

This invention relates to a process for the manufacture of polyolefin stabilizers of the poly(hydroxyphenylpropionamide)type, especially tris(alkylhydroxyphenylpropionyl)-hexahydrotriazines.

Stabilizers of the poly(hydroxyphenylpropionamide) type have hitherto been prepared by the reaction of polyamines with hydroxyphenylpropionic acids or functional derivatives of these such as the acid chlorides. This route has the disadvantages of high temperatures being required when acids are used and instability of the acid chlorides if they are used. Furthermore, in the case of the tris(alkylhydroxyphenylpropionyl)hexahydrotriazines the required polyamine, hexahydrotrianzine is not easily accessible.

The process of the present invention avoids these difficulties and utilizers, instead of the polyamine, 1,3,5-trisacryloyl-hexahydrotriazine which is readily manufactured from acrylonitrile and formaldehyde.

According to the invention there is provided a process for the manufacture of 1,3,5-tris(alkylhydroxyphenylpropionyl)hexahydrotriazines which comprises reacting 1,3,5-trisacryloyl-hexahydrotriazine with a phenol of the formula

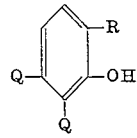

Wherein R is an alkyl, cycloalkyl, aryl, aralkyl or alkaryl group, one Q represents a hydrogen atom and the other either a hydrogen atom or a group of the type represented by R, in the presence of an alkali metal or alkali metal hydroxide catalyst in a polar solvent.

As examples of groups which may be represented by R there may be mentioned alkyl groups such as primary alkyl groups e.g. methyl, ethyl, secondary alkyl groups such as isopropyl, tertiary alkyl groups such as tert.-butyl, cycloalkyl groups such as cyclohexyl and α-methylcyclohexyl, aryl groups such as phenyl, aralkyl groups such as benzyl and alkaryl groups such as o-, m- and p-tolyl.

The polar solvent may be for example an alcohol such as ethanol, methanol, isopropanol, sec.-butanol or tert.-butanol, and includes dipolar aprotic solvents, such as dimethylformamide, dimethyl sulphoxide and sulpholane.

As catalysts there may be mentioned sodium or potassium metal or sodium or potassium alkoxides.

The reaction may be carried out by mixing the reactants, solvent and catalysts and heating at a temperature between 50°C. and 150°C. and preferably between 80°C. and 120°C. After reaction the product may be isolated by removal by distillation of excess solvent and acidification, followed by for example extraction in a solvent and removal of the solvent by distillation.

The invention is illustrated but not limited by the following Example in which all parts and percentages unless otherwise stated are by weight.

EXAMPLE

2 Parts of potassium are dissolved in 500 parts of tert.-butanol and 61.8 parts of 2,6-di-tert.-butylphenol are added. The suspension is refluxed and 24.9 parts of trisacryloylhexahydrotriazine are added and refluxing of the mixture continued for 16 hours. Excess solvent is distilled off and the residue is dissolved in ether after acidification with hydrochloric acid. The ethereal solution is washed with water, dried and the solvent removed to yield 20 parts of 1,3,5-tris-(β-[3,5-di-tert.-butyl-4-hydroxyphenyl] propionyl)hexahydrotriazine, m.p. 226–8°C. after recrystallization from ethanol.

We claim:

1. A process for the manufacture of 1,3,5-tris(alkyl hydroxyphenylpropionyl)hexahydrotriazines of the formula

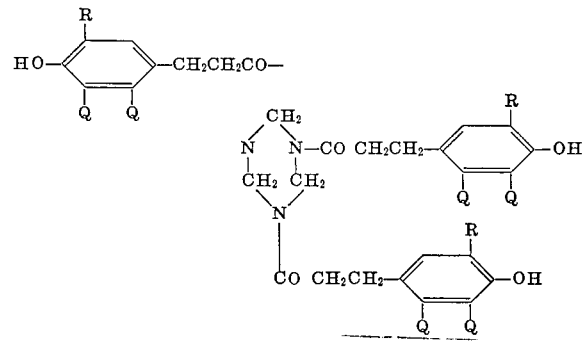

which comprises reacting 1,3,5-trisacryloylhexahydrotriazine with a phenol of the formula

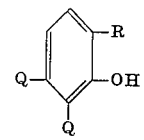

wherein R is methyl, ethyl, isopropyl, t-butyl, cyclohexyl, methylcyclohexyl, phenyl, benzyl and tolyl, one Q represents hydrogen and the other hydrogen or one of the R values, in the presence of an alkali metal or alkali metal hydroxide catalyst in a polar solvent.

2. A process as claimed in claim 1 wherein the solvent is an alcohol.

3. A process claimed in claim 1 wherein the process is carried out at a temperature between 50° and 150°C.

4. A process as claimed in claim 5 which comprises reacting 2,6-di-t-butylphenol, and trisacrylolylhexahydrotriazine to obtain 1,3,5-tris-(β-[3,5-di-t-butyl-4-hydroxyphenyl]propionyl)hexahydrotriazine.

* * * * *